(12) United States Patent
Amin et al.

(10) Patent No.: US 9,056,700 B2
(45) Date of Patent: Jun. 16, 2015

(54) DOSAGE DISPENSING CAP SYSTEM

(75) Inventors: Joseph Amin, Los Angeles, CA (US); Fernando Mota, Moreno Valley, CA (US); Lance M. Pritikin, Camarillo, CA (US)

(73) Assignee: Joseph Amin, Los Angeles, CA (US)

( * ) Notice: Subject to any disclaimer, the term of this patent is extended or adjusted under 35 U.S.C. 154(b) by 0 days.

(21) Appl. No.: 13/818,078

(22) PCT Filed: Aug. 22, 2011

(86) PCT No.: PCT/US2011/048591
§ 371 (c)(1),
(2), (4) Date: Feb. 20, 2013

(87) PCT Pub. No.: WO2012/024668
PCT Pub. Date: Feb. 23, 2012

(65) Prior Publication Data
US 2013/0153608 A1      Jun. 20, 2013

Related U.S. Application Data

(60) Provisional application No. 61/375,622, filed on Aug. 20, 2010.

(51) Int. Cl.
*B65D 47/24* (2006.01)
*A61J 1/03* (2006.01)
(Continued)

(52) U.S. Cl.
CPC ............ *B65D 47/243* (2013.01); *G01F 11/086* (2013.01); *A61J 1/03* (2013.01); *A61J 1/1412* (2013.01); *A61J 2001/1425* (2013.01); *B65D 83/0409* (2013.01); *B65D 83/0436* (2013.01)

(58) Field of Classification Search
CPC ............ B65D 83/094; B65D 83/0481; B65D 47/2031; B65D 47/2037; B65D 47/2043; G01F 11/00; G01F 11/003; G01F 11/08; G01F 11/086
USPC ......... 222/488, 490, 505, 506, 507, 514, 444, 222/445, 448; 221/298, 235, 206, 246, 260, 221/263, 264, 267
See application file for complete search history.

(56) References Cited

U.S. PATENT DOCUMENTS 2,122,299 A * 6/1938 Sloan ............................ 222/490
2,650,740 A * 9/1953 Hammerstein ................. 222/88
(Continued)

FOREIGN PATENT DOCUMENTS

JP         0687252 U    12/1994
KR    200291148 Y1    10/2002
(Continued)

OTHER PUBLICATIONS

International Search Report and Written Opinion in International Patent Application No. PCT/US2011/048591, from which the present U.S. national application is filed.

*Primary Examiner* — J. Casimer Jacyna
*Assistant Examiner* — Benjamin R Shaw
(74) *Attorney, Agent, or Firm* — Lance M. Pritikin (57) ABSTRACT

A dosage dispensing cap system is configured to release a fixed amount of medication from a container as a result of a single actuation by a user. A first cap element of the system may have a first aperture and be adapted to be attached to the container, which is configured to house a multiplicity of pills of a generally uniform size, or liquid medication of a particular volume. A second cap element may be flexible, have a flange member extending generally radially outward from a diaphragm member and be disposed between the first cap element and the container. The diaphragm member may have a mouth portion, a throat portion and a cavity generally disposed therebetween. The cavity may be generally large enough to contain a fixed number of pills or a dose volume of liquid. By way of a simple actuation, the mouth portion opens and the throat portion closes, thereby allowing the cap system to release a discrete number of pills or a dose volume of liquid medication.

12 Claims, 8 Drawing Sheets

(51) Int. Cl.
*A61J 1/14* (2006.01)
*B65D 83/04* (2006.01)
*G01F 11/08* (2006.01)

(56) References Cited

U.S. PATENT DOCUMENTS

| | | | |
|---|---|---|---|
| 2,730,274 A * | 1/1956 | Brown | 222/490 |
| 2,918,167 A * | 12/1959 | Lowen | 206/540 |
| 2,957,503 A * | 10/1960 | Stifter | 141/321 |
| 3,480,182 A | 11/1969 | Rigor | |
| 3,481,513 A * | 12/1969 | Ram | 222/490 |
| 3,516,536 A | 6/1970 | Ino | |
| 3,620,413 A | 11/1971 | Borsum | |
| 3,637,109 A * | 1/1972 | Stifter | 221/310 |
| 4,653,668 A * | 3/1987 | Gibilisco et al. | 221/298 |
| 5,623,980 A | 4/1997 | McMahan | |
| 7,681,750 B2 * | 3/2010 | Jackel | 215/235 |
| 7,988,016 B2 * | 8/2011 | Klein et al. | 221/263 |
| 2007/0181523 A1 * | 8/2007 | Jackel | 215/235 |
| 2010/0006589 A1 * | 1/2010 | Klein | 221/282 |
| 2013/0043280 A1 * | 2/2013 | Hagleitner | 222/207 |

FOREIGN PATENT DOCUMENTS

| | | |
|---|---|---|
| WO | 0230808 A1 | 4/2002 |
| WO | 02068291 A1 | 9/2002 |

* cited by examiner

DOSAGE DISPENSING CAP SYSTEM

RELATED APPLICATIONS

This application is a U.S. National Phase application under 35 U.S.C. §371 of International Phase Application No. PCT/US2011/048591, filed Aug. 22, 2011, which claims the benefit of U.S. Provisional Application No. 61/375,622, filed Aug. 20, 2010, the contents of each of which are incorporated by this reference in their entirety for all purposes as if fully set forth herein.

TECHNICAL FIELD

The present invention relates generally to the field of container caps which, upon actuation, allow for the dispensing of a discrete amount of product from the respective container. More particularly, the invention concerns a cap system for a pharmaceutical container which, upon actuation, dispenses a discrete number of pills or volume of liquid or gel medication from that container.

BACKGROUND

Those in the art have recognized the need for an improved cap system which allows for the release of a fixed number of pills, or fixed volume of liquid or gel medication, from a pharmaceutical container by way of simple actuation. Additional desirable features in such a cap system would include adaptability for use with a variety of standard pharmaceutical containers, low production cost, incorporation of safety features, and adaptability to dispense pills of various sizes and shapes from containers of various forms.

SUMMARY

A dosage dispensing cap system may be configured to release a fixed amount of medication from a container as a result of a single actuation by a user. The dosage dispensing cap system may include a main axis, a first cap element, and a second cap element. The first cap element may be adapted to be removably attached to the container, which is configured to house a multiplicity of pills of a generally uniform size, or liquid or gel medication of a particular volume. The first cap element may have a first aperture. The second cap element may be adapted to be generally axially disposed between the first cap element and the container. The second cap element may be flexible and have a diaphragm member and a flange member extending generally radially outward therefrom. The diaphragm member may have a mouth portion, a throat portion, a cavity generally disposed therebetween, a first end and a second end. The mouth portion may generally extend in a direction from approximately the first end toward approximately the second end. The cavity may be generally large enough to contain the fixed number of pills or the fixed volume of liquid or gel.

In particular embodiments, the diaphragm member may have a laterally released configuration and a laterally compressed configuration, and the diaphragm member may be elastically biased toward its laterally released configuration. In such embodiments, the first end and the second end may be in closer proximity to each other when the diaphragm member is in its laterally compressed configuration than in its laterally released configuration. When the diaphragm member is in its laterally released configuration, the throat portion may be adapted to allow passage of at least one of the pills therethrough and the mouth portion adapted to restrict passage of any of the pills therethrough. When the diaphragm member is in the laterally compressed configuration, the throat portion may be adapted to restrict passage of any of the pills therethrough and the mouth portion adapted to allow passage of at least one of the pills therethrough.

Depending upon the particular embodiment, the diaphragm member may be moved between its laterally released and laterally compressed configurations by way of, for example, axial compression of the first cap element, or lateral compression of first and second compression tabs. Certain embodiments may include a third cap element adapted to be generally axially disposed between the second cap element and the container. The third cap element may be generally rigid and have a third aperture.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Referring now to the drawings, like reference numerals designate identical or corresponding features throughout the several views.

Throughout the several figures, embodiments of a dosage dispensing cap system are shown generally at 100, and typically comprise a main axis 106, a first cap element 108 and a second cap element 112. The dosage dispensing cap system 100 is generally for releasing a fixed dosage of pills 102, liquids or gels from a container 104 as a result of a single actuation. The term "single actuation" is intended to mean the movement of one or more parts, including for example, elements, members and portions, in a coordinated sequence, to produce a particular desired outcome such as dispensing a fixed number of pills.

In preferred embodiments, the first cap element 108 is adapted to be removably attached to a container 104 configured to house a multiplicity of pills (such as those shown, for example, at 102) of a generally uniform size. This removable attachment may be achieved by way of, for example, snap-fit, threaded relationship, or the like. The first cap element 108 typically has a first aperture 110 therethrough which may be adapted to easily pass one or more pills 102. The first cap element 108 is generally made from a rigid material, such as an FDA approved plastic.

Figure 1:
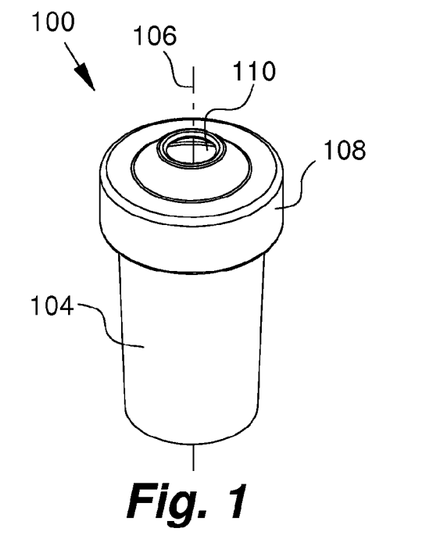
FIG. 1 is a diagrammatic perspective view of a first embodiment of a cap system in accordance with the present invention.
Figure 2:
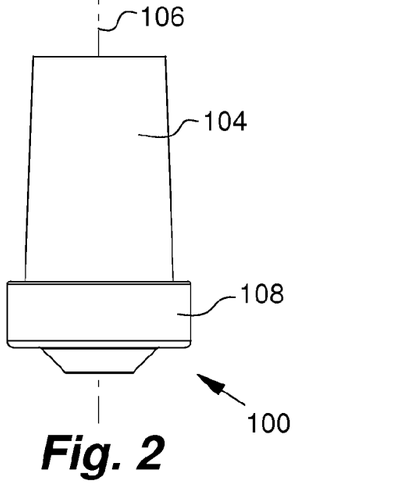
FIG. 2 is a diagrammatic side view of the embodiment of FIG. 1, but shown in dispensing orientation.
Figure 3:
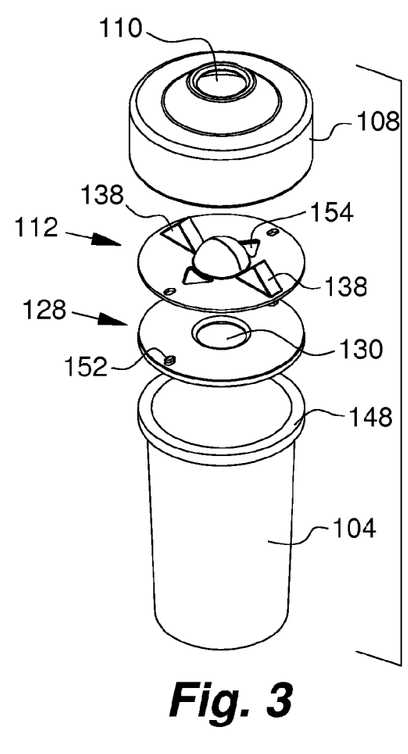
FIG. 3 is a diagrammatic exploded view of the embodiment of FIG. 1.
Figure 4:
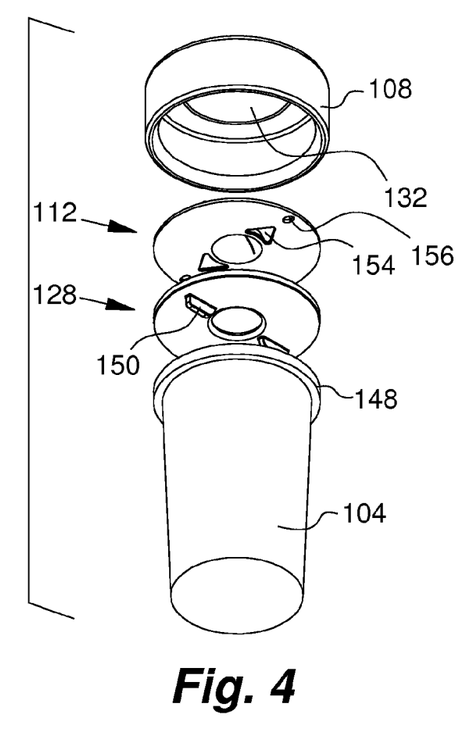
FIG. 4 is a further diagrammatic exploded view of the embodiment of FIG. 1.
Figure 24:
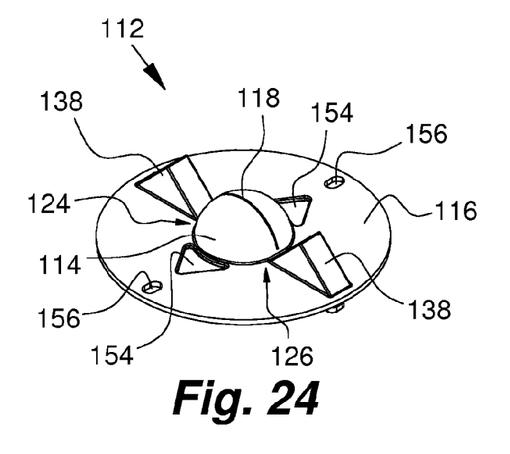
FIG. 24 is a diagrammatic perspective view of an embodiment of a second cap element in accordance with the present invention.
Figure 25:
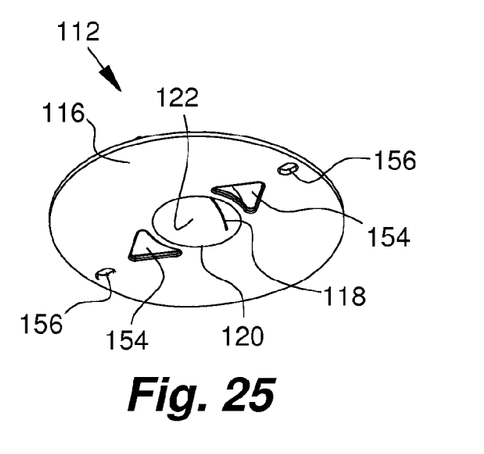
FIG. 25 is a further diagrammatic perspective view of the embodiment of a second cap element shown in FIG. 24.
Figures 26, 27:
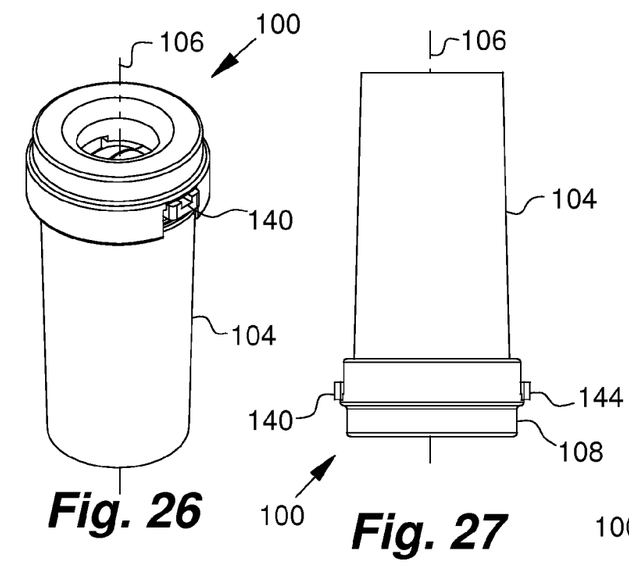
FIG. 26 is a diagrammatic perspective view of a third embodiment of a cap system in accordance with the present invention.
FIG. 27 is a diagrammatic side view of the embodiment of FIG. 26, but shown in dispensing orientation.
Figure 28:
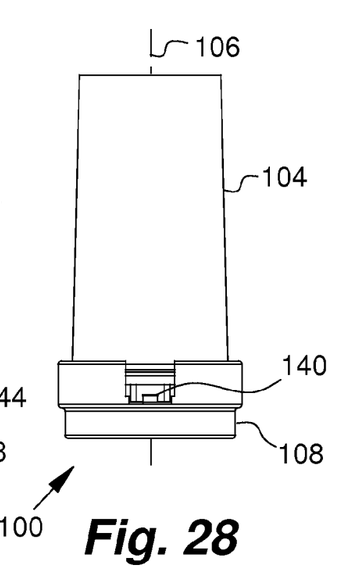
FIG. 28 is a further diagrammatic side view of the embodiment of FIG. 26, also shown in dispensing orientation.
Figure 29:
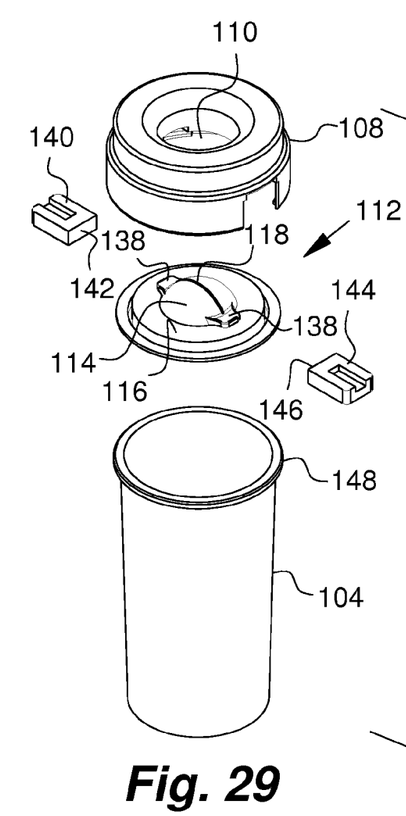
FIG. 29 is a diagrammatic exploded view of the embodiment of FIG. 26.
Figure 30:
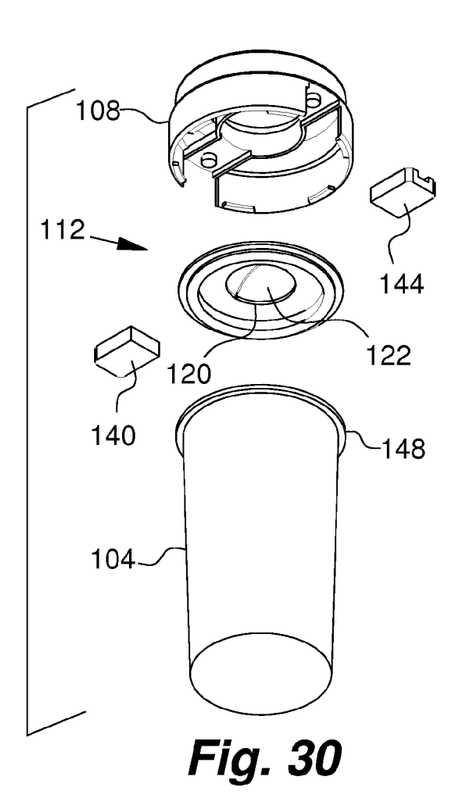
FIG. 30 is a further diagrammatic exploded view of the embodiment of FIG. 26.
Figures 31, 32:
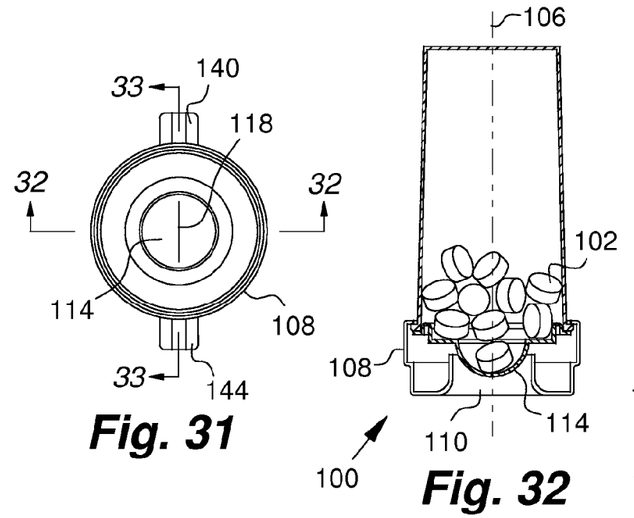
FIG. 31 is a diagrammatic bottom view of the embodiment of FIG. 28 with the first cap element in its active position, the first and second compression tabs in their respective outward positions, the diaphragm member in its laterally released configuration, and a single pill in the cavity of the diaphragm member.
FIG. 32 is a diagrammatic cross-sectional view taken along line 32-32 of FIG. 31.

Referring to FIGS. 3, 24 and 25 for close illustration, embodiments of the second cap element 112 are typically adapted to be generally axially disposed between the first cap element 108 and the container 104. The second cap element 112 may be flexible and have a diaphragm member 114 and a flange member 116 extending generally radially outward therefrom. In certain embodiments, the engagement between the second cap element 112 and the rim 148 of the container 104 establishes a seal which is generally gas-tight or liquid-tight. The diaphragm member 114 has mouth portion 118, a throat portion 120, a cavity 122 generally disposed therebetween, a first end (shown generally at 124) and a second end (shown generally at 126). The mouth portion 118 may generally extend in a direction from approximately the first end 124 toward approximately the second end 126. The cavity 122 may be generally large enough to contain the fixed number of pills. The second cap element 112 may be made of a flexible material such as, for example, an FDA approved polymer or the like. The second cap element 112 may also feature compression relief apertures 154 to reduce material usage and minimize undesirable resistance to compression deformation of the diaphragm member 114 during operation of the cap system 100.

Embodiments of a dosage dispensing cap system in accordance with the present invention may further comprise a third cap element 128 adapted to be generally axially disposed between the second cap element 112 and the container 104. The third cap element 128 may be generally rigid and may have a third aperture 130 or other opening therethrough. The third cap element 128 may generally be made from a rigid material, such as an FDA approved plastic. In certain embodiments, the third cap element helps to prevent portions of the second cap element 112 from being forced down into the container 104 when the cap system is being actuated by a user.

Referring to FIGS. 3, 4, 24 and 25 for illustration, in particular embodiments, the third cap element 128 may include one or more third detent elements 150, or similar structures, which in part help keep the third cap element 128 axially aligned with the container 104. Third detent elements 150 may also be adapted to be press-fit into the container 104, so as to help secure the attachment of third cap element 128 to the container 104 and hinder any undesirable rotation with respect to each other. Further, the second cap element 112 and the third cap element 128 may also include second detent apertures 156 and second detent elements 152, respectively, or similar structures, in part to help prevent the second cap element 112 from undesirably rotating with respect to the third cap element 128 or the container 104 when the first cap element 108 is being rotated.

Figures 5, 6:
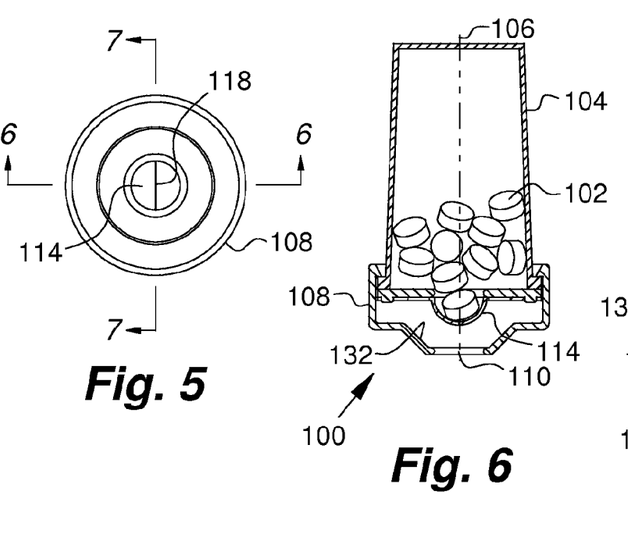
FIG. 5 is a diagrammatic bottom view of the embodiment of FIG. 2 with the first cap element in its axially released position, the diaphragm member in its laterally released configuration, and a single pill in the cavity of the diaphragm member.
FIG. 6 is a diagrammatic cross-sectional view taken along line 6-6 of FIG. 5.
Figure 7:
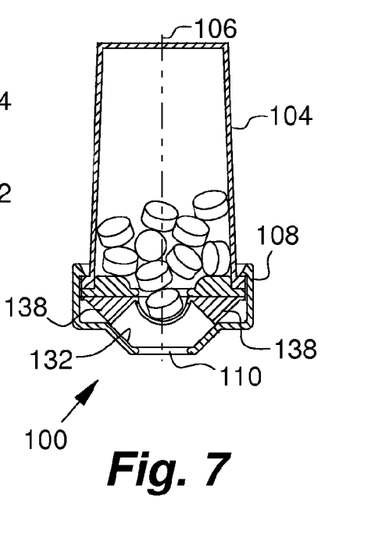
FIG. 7 is a diagrammatic cross-sectional view taken along line 7-7 of FIG. 5.
Figure 8:
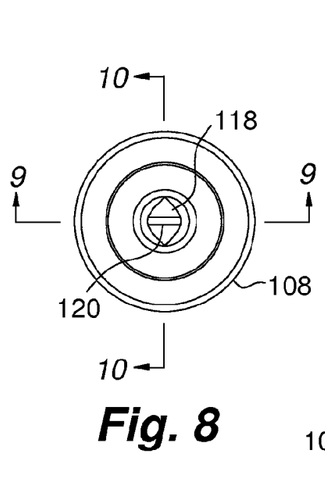
FIG. 8 is a diagrammatic bottom view of the embodiment of FIG. 2 with the first cap element in its axially compressed position, the diaphragm member in its laterally compressed configuration, and a single pill having been dispensed.
Figure 9:
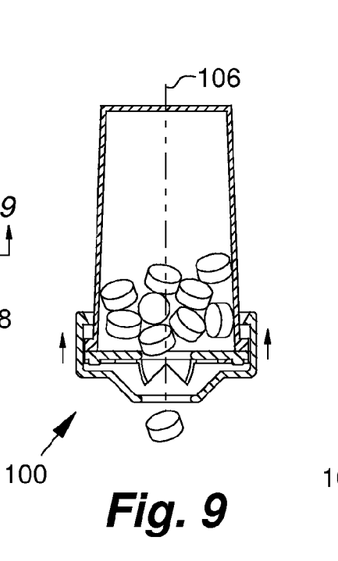
FIG. 9 is a diagrammatic cross-sectional view taken along line 9-9 of FIG. 8.
Figure 10:
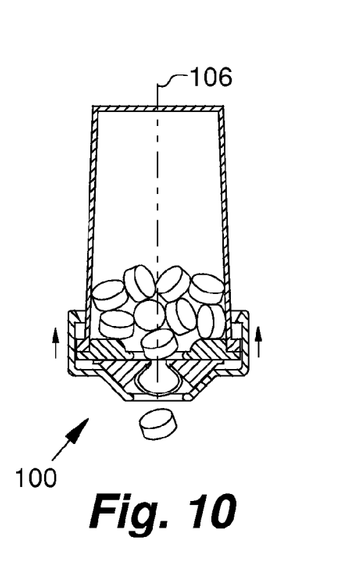
FIG. 10 is a diagrammatic cross-sectional view taken along line 10-10 of FIG. 8.
Figure 11:
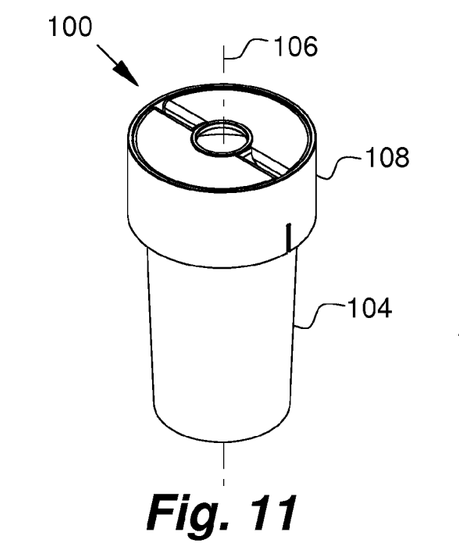
FIG. 11 is a diagrammatic perspective view of a second embodiment of a cap system in accordance with the present invention.
Figure 12:
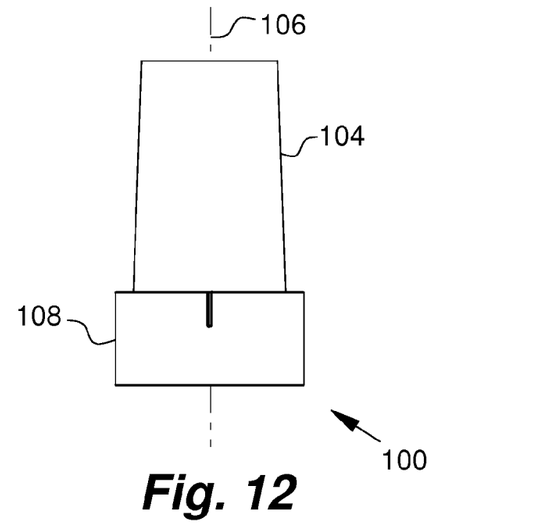
FIG. 12 is a diagrammatic side view of the embodiment of FIG. 11, but shown in dispensing orientation.
Figure 13:
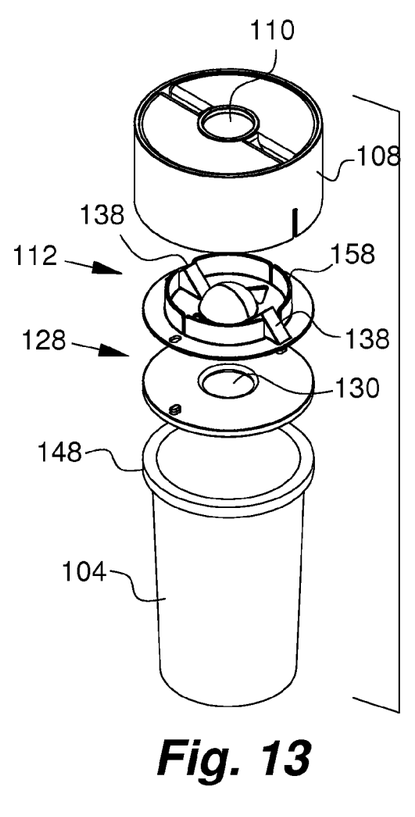
FIG. 13 is a diagrammatic exploded view of the embodiment of FIG. 11.

In typical embodiments, the diaphragm member 114 may further have a laterally released configuration and a laterally compressed configuration. In such embodiments, the diaphragm member 114 may typically be elastically biased toward its laterally released configuration (shown, for example, in FIGS. 24 and 25). The first end 124 and the second end 126 are in closer proximity to each other when the diaphragm member 114 is in its laterally compressed configuration than in its laterally released configuration. The throat portion 120 may be adapted to allow passage of at least one of the pills 102 therethrough and the mouth portion 118 may be adapted to restrict passage of any of the pills 102 therethrough when the diaphragm member 114 is in its laterally released configuration (see, for example, FIGS. 5-7). The throat portion 120 may be adapted to restrict passage of any of the pills 102 therethrough and the mouth portion 118 may be adapted to allow passage of at least one of the pills 102 therethrough when the diaphragm member 114 is in its laterally compressed configuration (see, for example, FIGS. 8-10).

In particular embodiments, the first cap element 108 has an axially released position and an axially compressed position, and includes an adaptation wherein movement of the first cap element 108 from its axially released position (see, for example, FIGS. 5-7) toward its axially compressed position (see, for example, FIGS. 8-10) may result in transition of the diaphragm member 114 from the laterally released configuration toward the laterally compressed configuration. In preferred such embodiments the adaptation comprises a first interface element 132 and a second interface element (comprised of, for example, second interface portions 138). The second interface element may have two second interface portions 138 disposed generally proximal the first end 124 and the second end 126 respectively.

The first interface element 132 is typically adapted to slidably and laterally displacingly engage the second interface portions 138 when the first cap element 108 is being moved from its axially released position toward its axially compressed position. To aid in the slidability between respective components, it may be preferred that the friction between them is minimized by way of, for example, the use of low-friction materials in their formation, or a low-friction finish at locations where they are to make contact during operation of the cap system 100. Because the diaphragm member 114 is typically biased toward its laterally released configuration, the slidably and laterally displacing engagement between the second interface portions 138 and the first interface element 132 may desirably result in a biasing of the first cap element 108 toward its axially released position.

Figure 14:
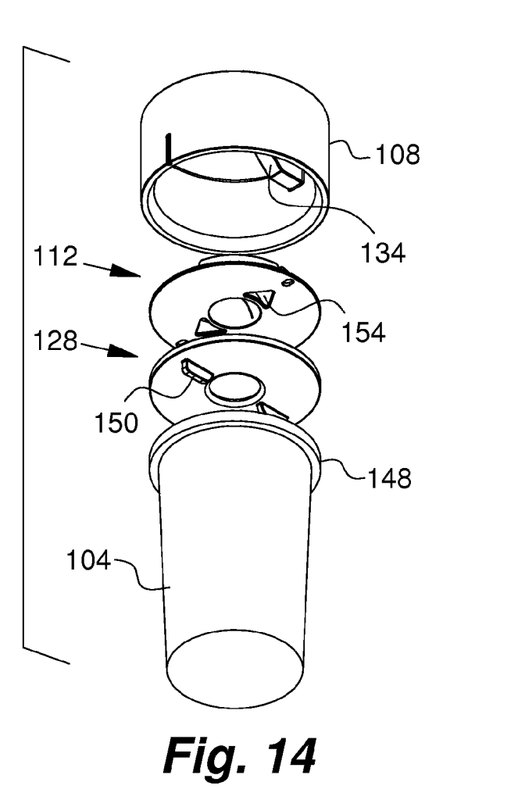
FIG. 14 is a further diagrammatic exploded view of the embodiment of FIG. 11.
Figures 15, 16:
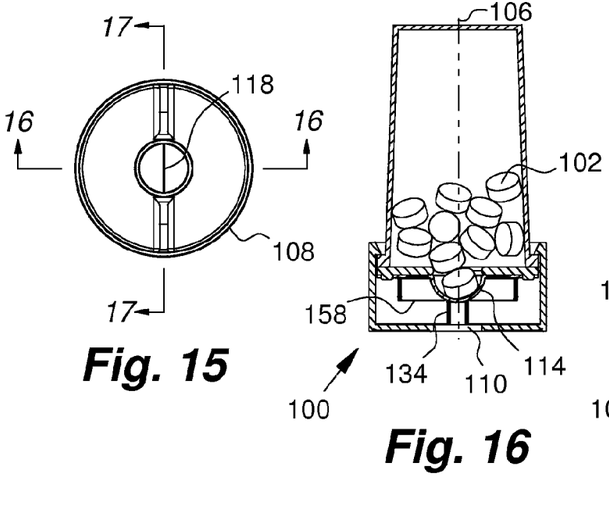
FIG. 15 is a diagrammatic bottom view of the embodiment of FIG. 12 with the first cap element in its active and axially released positions, the diaphragm member in its laterally released configuration, and a single pill in the cavity of the diaphragm member.
FIG. 16 is a diagrammatic cross-sectional view taken along line 16-16 of FIG. 15.
Figure 17:
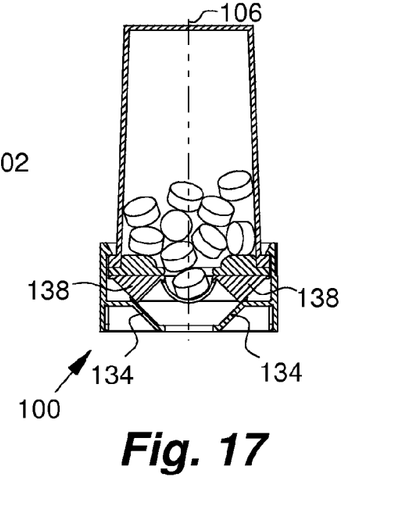
FIG. 17 is a diagrammatic cross-sectional view taken along line 17-17 of FIG. 15.
Figures 18, 19:
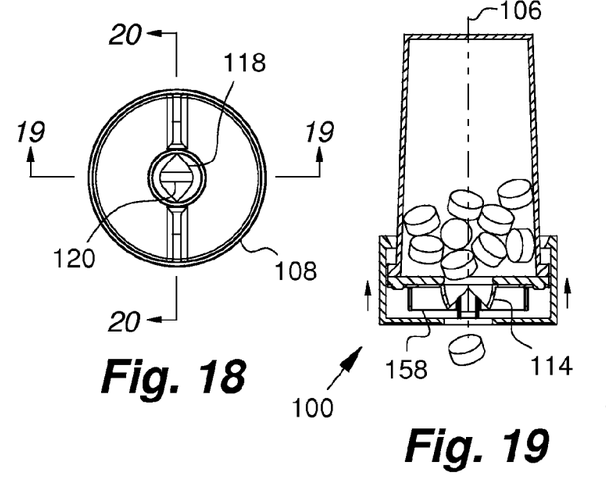
FIG. 18 is a diagrammatic bottom view of the embodiment of FIG. 12 with the first cap element in its active and axially compressed positions, the diaphragm member in its laterally compressed configuration, and a single pill having been dispensed.
FIG. 19 is a diagrammatic cross-sectional view taken along line 19-19 of FIG. 18.
Figure 20:
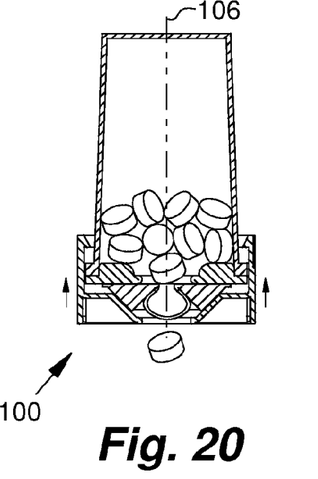
FIG. 20 is a diagrammatic cross-sectional view taken along line 20-20 of FIG. 18.

In certain embodiments, such as the one illustrated for example in FIGS. 1-10, the first interface element 132 may be integral with the first cap element 108 and the second interface element may be integral with the second cap element 112. In other embodiments, the first interface element 132 may have two first interface portions 134 (see, for example, FIGS. 14 and 17), the first interface element 132 may be integral with the first cap element 108 and the second interface element may be integral with the second cap element 112.

Figures 21, 22:
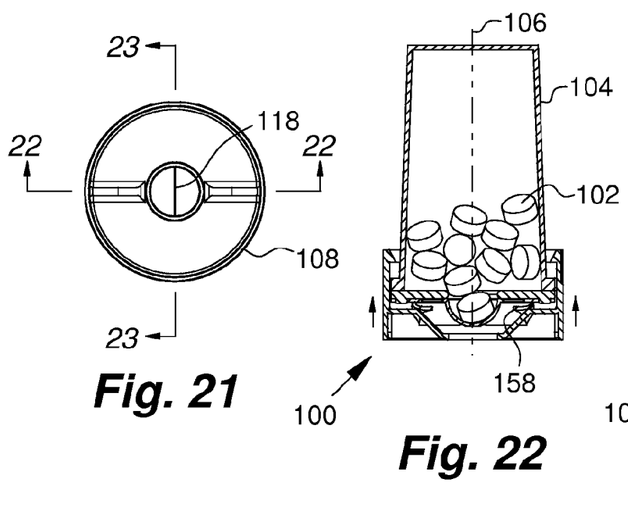
FIG. 21 is a diagrammatic bottom view of the embodiment of FIG. 12 with the first cap element in its safe and axially compressed positions, the diaphragm member in its laterally released configuration, and the mouth portion continuing to restrict passage of any pills therethrough.
FIG. 22 is a diagrammatic cross-sectional view taken along line 22-22 of FIG. 21.
Figure 23:
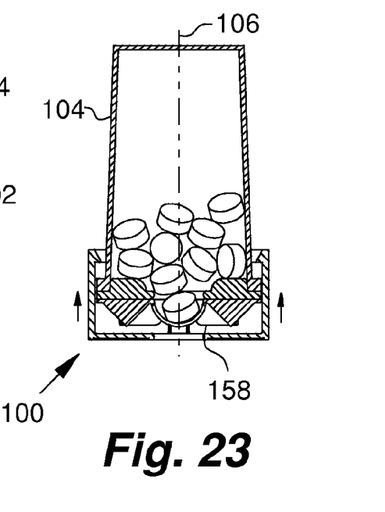
FIG. 23 is a diagrammatic cross-sectional view taken along line 23-23 of FIG. 21.

Referring to FIGS. 11-14 for illustration, in particular embodiments, the first cap element 108 may be adapted to be generally rotatable about the main axis 106 between an active position and a safe position. As illustrated for example in FIGS. 15-20, in such embodiments, the first interface portions 134 may each be in general axial alignment with a respective one of the second interface portions 138 when the first cap element 108 is in its active position. Conversely, as illustrated for example in FIGS. 21-23, the first interface portions 134 may each be out of axial alignment with both of the second interface portions 138 when the first cap element 108 is in its safe position. In such embodiments, illustrated for example in FIGS. 15-23, the second cap portion 112 may include a spring member 158 which serves to bias the first cap element 108 to return to its axially released position when it is in its safe position. FIG. 22 illustrates how the spring member 158 may elastically buckle or bend in response to contact with the first interface portions 134, thereby urging the first cap portion 108 to return to its axially released position.

Figure 33:
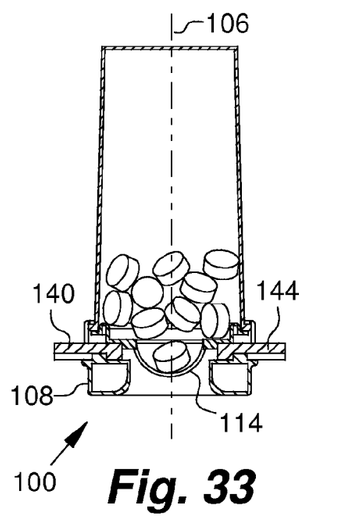
FIG. 33 is a diagrammatic cross-sectional view taken along line 33-33 of FIG. 31.
Figures 34, 35:
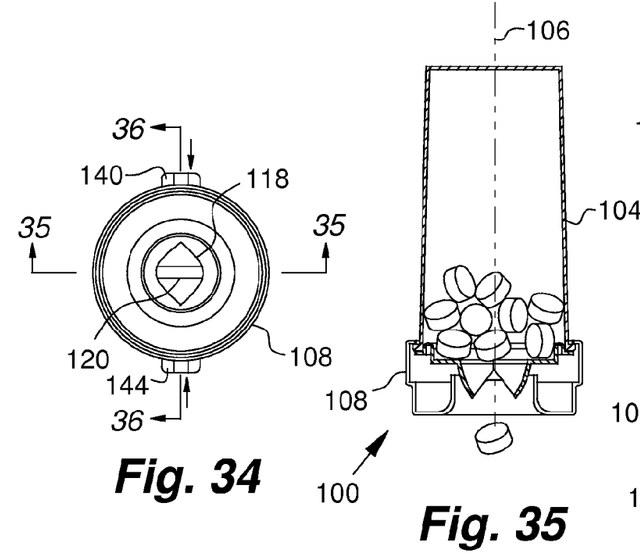
FIG. 34 is a diagrammatic bottom view of the embodiment of FIG. 28 with the first cap element in its active position, the first and second compression tabs in their respective inward positions, the diaphragm member in its laterally compressed configuration, and a single pill having been dispensed.
FIG. 35 is a diagrammatic cross-sectional view taken along line 35-35 of FIG. 34.
Figure 36:
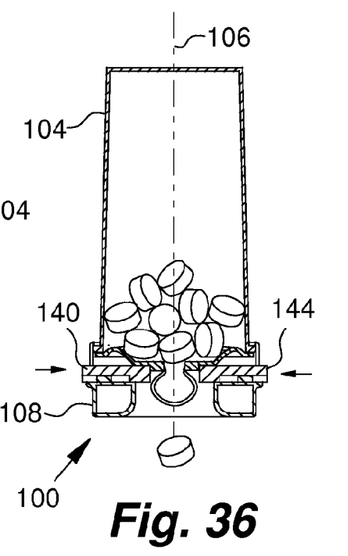
FIG. 36 is a diagrammatic cross-sectional view taken along line 36-36 of FIG. 34.

Referring to FIGS. 26-30 for illustration, certain embodiments may further comprise a first compression tab 140 with a first inner end 142 and a second compression tab 144 with a second inner end 146. The first compression tab 140 and second compression tab 144 are typically guidedly associated with the first cap element 108 such that they may each be moved generally laterally between an inward position (see for example FIG. 36) and an outward position (see for example FIG. 33). Such embodiments generally further comprise an adaptation wherein movement of the first compression tab 140 and the second compression tab 144 from their respective outward positions toward their respective inward positions may result in transition of the diaphragm member 114 from its laterally released configuration toward its laterally compressed configuration. Although not shown in the figures, such embodiments may also comprise a third cap element 128, at least in part to help prevent the second cap element 112 from being forced toward the container 104 during actuation of the first compression tab 140 and the second compression tab 144.

Figures 37, 38:
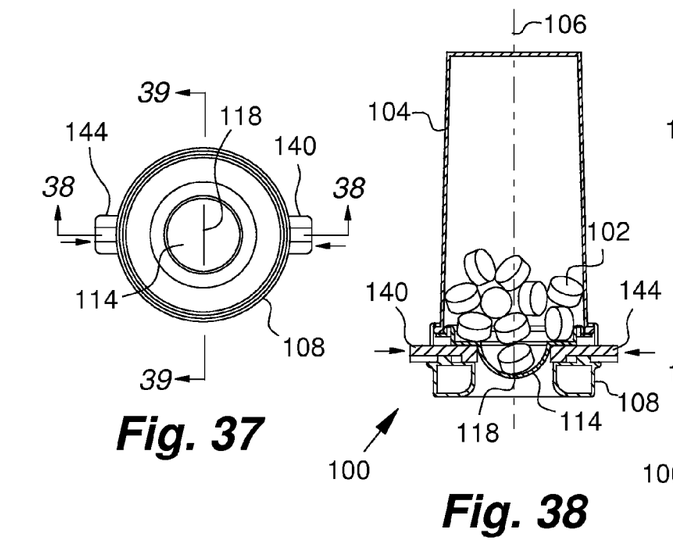
FIG. 37 is a diagrammatic bottom view of the embodiment of FIG. 28 with the first cap element in its safe position, the first and second compression tabs having been moved toward their respective inward positions, the diaphragm member in its laterally released configuration, and the mouth portion continuing to restrict passage of any pills therethrough.
FIG. 38 is a diagrammatic cross-sectional view taken along line 38-38 of FIG. 37.
Figure 39:
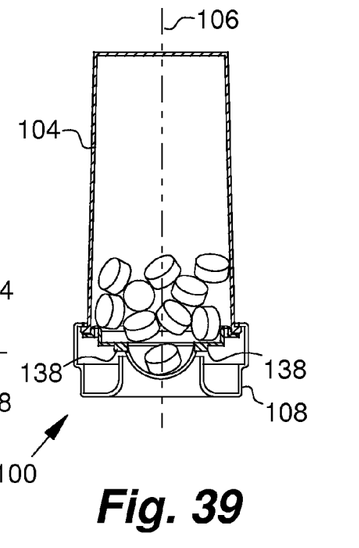
FIG. 39 is a diagrammatic cross-sectional view taken along line 39-39 of FIG. 37.
Figure 40:
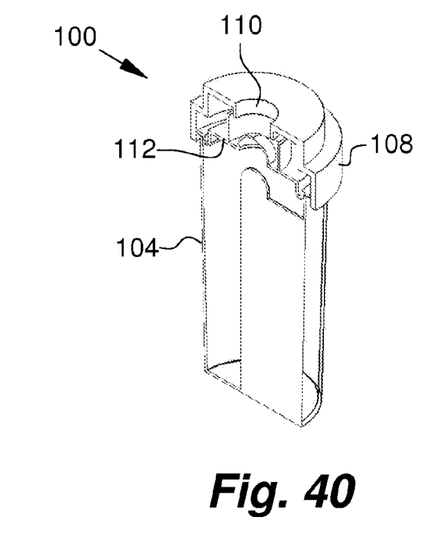
FIG. 40 is a diagrammatic perspective broken view of a fourth embodiment of a cap system in accordance with the present invention.
Figure 41:
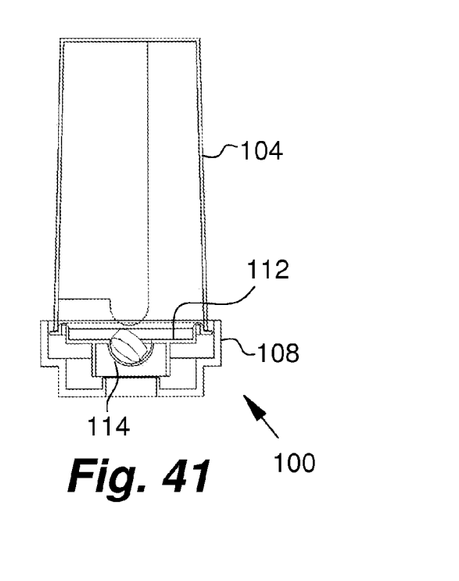
FIG. 41 is a diagrammatic cross-sectional view of the embodiment of FIG. 40, in dispensing orientation.

In particular embodiments with laterally actuatable compression tabs, such as the one illustrated in FIGS. 26-36, the first cap element 108 may be adapted to be generally rotatable about the main axis 106 between an active position and a safe position. As illustrated for example in FIGS. 31-36, the first compression tab 140 and the second compression tab 144 may each be generally in radial alignment with a respective one of the second interface portions 138 when the first cap element 108 is in its active position. As illustrated for example in FIGS. 37-39, the first compression tab 140 and second compression tab 144 are each out of radial alignment with both of the second interface portions 138 when the first cap element 108 is in its safe position.

Importantly, embodiments of the cap system 100 can be uniquely adapted to fit any of a plurality of bottles or vials (whether industry standard or customized), and to dispense fixed dosages of pills having nearly any particular quantity, shape or size. It is also envisioned that embodiments of a cap system 100 in accordance with the present invention may also be adapted and used to dispense discrete dosages of liquids or gels. In such an embodiment, for example, the container 104 may be adapted to house a stored volume of liquid, and the system adapted to release a dose volume of the liquid.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A dosage dispensing cap system for releasing a fixed number of pills from a container as a result of a single actuation, the dosage dispensing cap system comprising:
   (a) a main axis;
   (b) a first cap element adapted to be removably attached to a container configured to house a multiplicity of pills of a generally uniform size, the first cap element having a first aperture therethrough; and
   (c) a second cap element adapted to be generally axially disposed between the first cap element and the container, the second cap element being flexible and having a diaphragm member and a flange member extending generally radially outward therefrom, the diaphragm member having mouth portion, a throat portion, a cavity generally disposed therebetween, a first end and a second end, the mouth portion generally extending in a direction from approximately the first end toward approximately the second end, the cavity being generally large enough to contain a fixed number of the pills, the diaphragm member further having a laterally released configuration and a laterally compressed configuration, the diaphragm member being elastically biased toward its laterally released configuration, the first end and the second end being in closer proximity to each other when the diaphragm member is in the laterally compressed configuration than in the laterally released configuration, the throat portion being adapted to allow passage of at least one of the pills therethrough and the mouth portion being adapted to restrict passage of any of the pills therethrough when the diaphragm member is in the laterally released configuration, the throat portion being adapted to restrict passage of any of the pills therethrough and the mouth portion being adapted to allow passage of at least one of the pills therethrough when the diaphragm member is in the laterally compressed configuration.

2. A dosage dispensing cap system as defined in claim 1 in which the first cap element has an axially released position and an axially compressed position, and includes an adaptation wherein movement of the first cap element from the axially released position to the axially compressed position results in transition of the diaphragm member from the laterally released configuration to the laterally compressed configuration.

3. A dosage dispensing cap system as defined in claim 2 in which the adaptation comprises a first interface element and a second interface element, the second interface element having two second interface portions disposed generally proximal the first end and the second end respectively, the first interface element being adapted to slidably and laterally displacingly engage the second interface portions when the first cap element is being moved from the axially released position toward the axially compressed position.

4. A dosage dispensing cap system as defined in claim 3 in which the first interface element is integral with the first cap element and the second interface element is integral with the second cap element.

5. A dosage dispensing cap system as defined in claim 3 in which the first interface element has two first interface portions, the first interface element is integral with the first cap element and the second interface element is integral with the second cap element.

6. A dosage dispensing cap system as defined in claim 5 in which the first cap element is adapted to be generally rotatable about the main axis between an active position and a safe position, the first interface portions each being in general axial alignment with a respective one of the second interface portions when the first cap element is in the active position, the first interface portions each being out of axial alignment with both of the second interface portions when the first cap element is in the safe position.

7. A dosage dispensing cap system for releasing a dose volume of a liquid from a container as a result of a single actuation, the dosage dispensing cap system comprising:
   (a) a main axis;
   (b) a first cap element adapted to be removably attached to a container configured to house a stored volume of a liquid, the first cap element having a first aperture therethrough; and
   (c) a second cap element adapted to be generally axially disposed between the first cap element and the container, the second cap element being flexible and having a diaphragm member and a flange member extending generally radially outward therefrom, the diaphragm member having mouth portion, a throat portion, a cavity generally disposed therebetween, a first end and a second end, the mouth portion generally extending in a direction from approximately the first end toward approximately the second end, the cavity being generally large enough to contain a dose volume of the liquid, the diaphragm member further having a laterally released configuration and a laterally compressed configuration, the diaphragm member being elastically biased toward its laterally released configuration, the first end and the second end being in closer proximity to each other when the diaphragm member is in the laterally compressed configuration than in the laterally released configuration, the throat portion being adapted to allow passage of the dose volume therethrough and the mouth portion being adapted to substantially restrict passage of the liquid therethrough when the diaphragm member is in the laterally released configuration, the throat portion being adapted to substantially restrict passage of the liquid therethrough and the mouth portion being adapted to allow passage of the dose volume therethrough when the diaphragm member is in the laterally compressed configuration.

8. A dosage dispensing cap system as defined in claim 7 in which the first cap element has an axially released position and an axially compressed position, and includes an adaptation wherein movement of the first cap element from the axially released position to the axially compressed position results in transition of the diaphragm member from the laterally released configuration to the laterally compressed configuration.

9. A dosage dispensing cap system as defined in claim 8 in which the adaptation comprises a first interface element and a second interface element, the second interface element having two second interface portions disposed generally proximal the first end and the second end respectively, the first interface element being adapted to slidably and laterally displacingly engage the second interface portions when the first cap element is being moved from the axially released position toward the axially compressed position.

10. A dosage dispensing cap system as defined in claim 9 in which the first interface element is integral with the first cap element and the second interface element is integral with the second cap element.

11. A dosage dispensing cap system as defined in claim 9 in which the first interface element has two first interface portions, the first interface element is integral with the first cap element and the second interface element is integral with the second cap element.

12. A dosage dispensing cap system as defined in claim 11 in which the first cap element is adapted to be generally rotatable about the main axis between an active position and a safe position, the first interface portions each being in general axial alignment with a respective one of the second interface portions when the first cap element is in the active position, the first interface portions each being out of axial alignment with both of the second interface portions when the first cap element is in the safe position.

\* \* \* \* \*